Dec. 20, 1949  E. A. THOMPSON  2,492,074
VEHICLE VISOR
Filed July 16, 1946  4 Sheets-Sheet 2

Inventor
EARL A. THOMPSON
By Milans & Milans
Attorneys

Dec. 20, 1949       E. A. THOMPSON       2,492,074
VEHICLE VISOR
Filed July 16, 1946       4 Sheets-Sheet 3
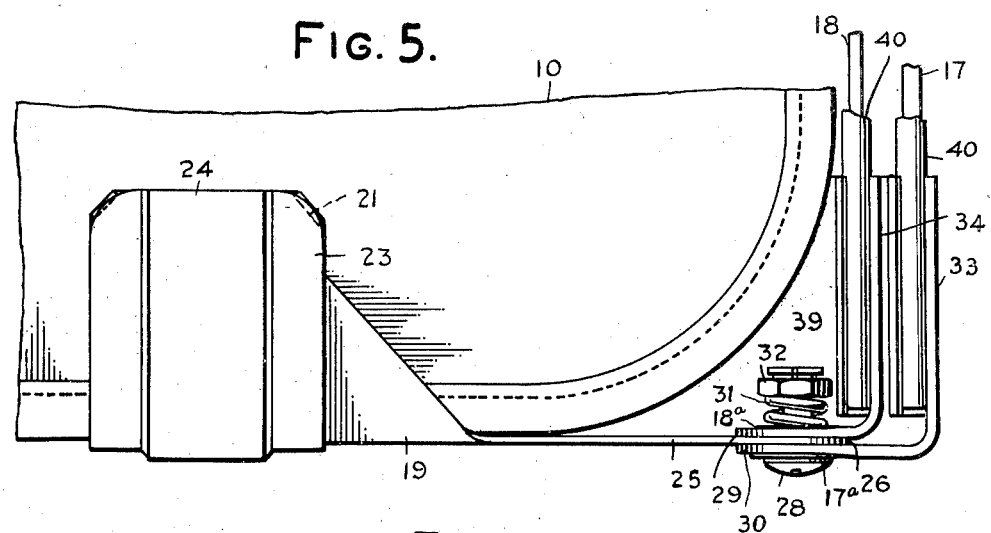
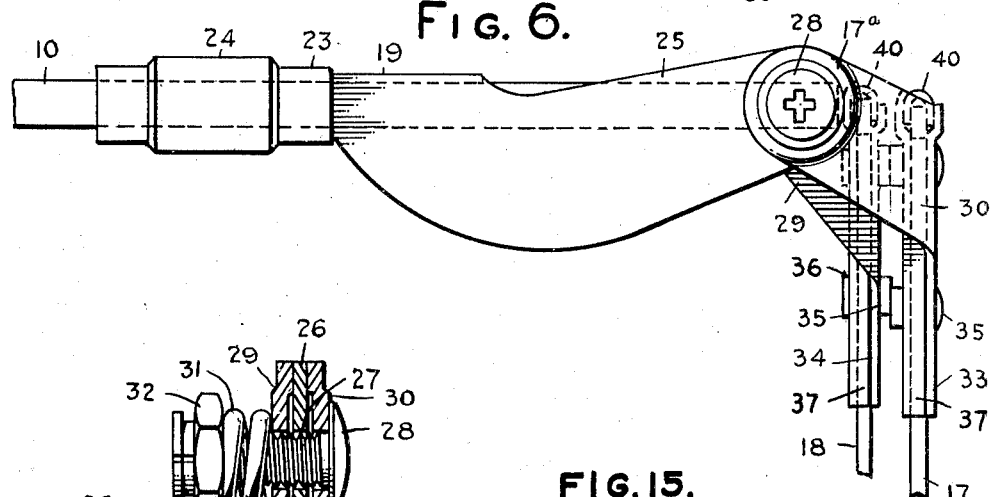
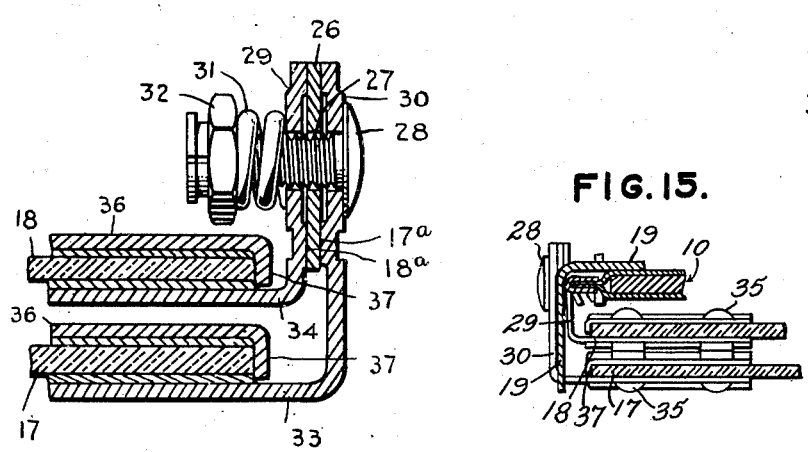
Inventor
EARL A. THOMPSON
By Milans & Milans
Attorneys Dec. 20, 1949  E. A. THOMPSON  2,492,074
VEHICLE VISOR
Filed July 16, 1946  4 Sheets-Sheet 4
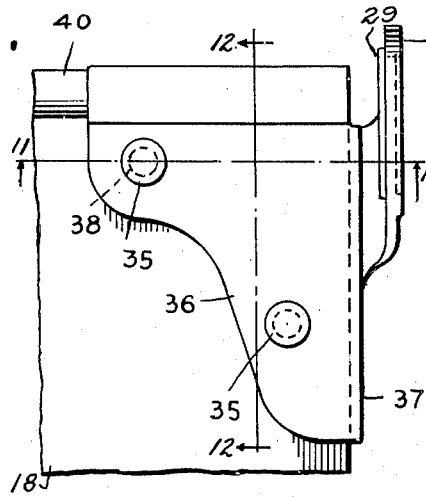
FIG. 10.
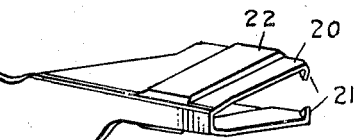
FIG. 13.
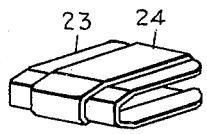
FIG. 14.
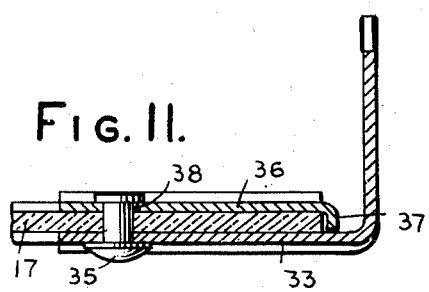
FIG. 11.
FIG. 12.
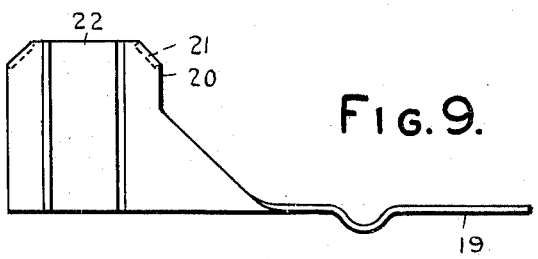
FIG. 9.
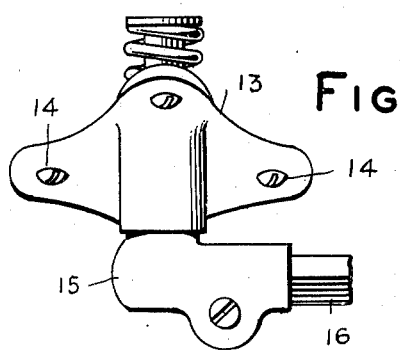
FIG. 7.
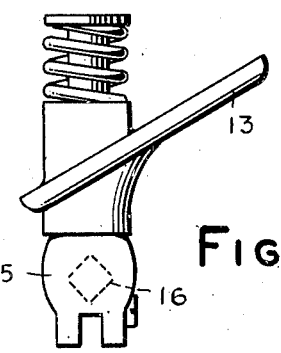
FIG. 8.
Inventor
EARL A. THOMPSON.
By William McLean
Attorneys Patented Dec. 20, 1949

2,492,074

UNITED STATES PATENT OFFICE 2,492,074

VEHICLE VISOR

Earl A. Thompson, Bloomfield Hills, Mich., assignor to Earl A. Thompson Manufacturing Company, Ferndale, Mich., a copartnership consisting of E. A. Thompson and E. F. Thompson Application July 16, 1946, Serial No. 683,942

21 Claims. (Cl. 160—213)

This invention relates to improvements in visors commonly employed in automobiles or other vehicles for shielding the eyes of an operator or occupant from the disadvantageous effects of the direct rays of the sun or indirect reflections from metal parts, such as the hood of the machine, as well as screening the objectionable rays of headlights of oncoming vehicles, etc.

The various uses to which the invention is applicable will be apparent from an understanding of the structure and function thereof, although the invention will be herein particularly pointed out in connection with automobile service.

It is the usual practice to employ a visor of opaque or similar nature in a machine comprising a strip, panel or sheet of suitable dimensions, pivoted at its forward edge within the top of the vehicle, adjacent to the upper margin of the front windshield thereof, to have a swinging movement through an arc running from a stored or unused position, approximately parallel to the top, down to a usable position in the space intervening the windshield or front portion of the vehicle and the user.

Devices such as just stated are obviously limited in their use and fail in many respects to adequately shield the eyes of the user where the confronting conditions require special adjustments of the visor, variations in the extent of the same, or differentiation in the character of the shield to meet the widely different conditions resulting from the direction of the rays from which the eyes are to be protected, and the varying intensity thereof.

It is the object of the present invention to provide an adjustable and extensible visor of associated panels or lenses having light filtering qualities of different density capable of meeting the conditions just recited, either from the standpoint of an initial complete arrangement to be installed, or as an attachment to be secured to and adjustable with relation to the customary single opaque panel or visor already installed in the vehicle.

Another object of the invention, primarily with respect to the utilization of a supplemental visor, in connection with the usually installed visor of a machine to enable their conjoint use, is to provide especially adaptable and novel connecting means between the normal and supplemental visor eliminating the necessity of providing rivets or separate elements requiring perforating or riveting through the normal visor and enabling securing the supplemental visor thereto in easy manner without detaching the normal visor from its mounting in the machine, while at the same time affording a substantially permanent connection of the two visors (normal and supplemental) together to substantially prevent any ready removal or theft of the supplemental visor attachment. The connection or installing of the supplemental visor with reference to the normal visor is such that the use of special tools are rendered unnecessary.

The preferred embodiment of the invention comprises three visor panels or sections correlated so that they may be adjusted to afford the user optional protection whereby to meet various conditions where it is desirable or necessary to shield the eyes of the operator or occupant of the vehicle. Examples are by the use of an opaque or translucent shield or panel to substantially bar very severe sun rays or glares; or where confronted by relatively different or less intense or milder conditions to use either one or both, of the two transparent supplemental panels or lenses, wherefrom three degrees of protection may be afforded dependent upon the use of either of the supplemental panels alone and apart from each other, or the superimposing of the two supplemental panels as a unitary shield.

Ancillary features of such embodiment of the invention are novel means for mounting the various panels in operative relationship whereby to enable the supplemental panels to be permanently and securely attached to an already installed normal or opaque panel without removing the same from the vehicle; means for pivoting or hinging the supplemental panels whereby they may be adjusted without interference, one to occupy a position extended from the normal panel in a direction rearwardly of the same and the other forwardly to underlie said normal panel in the stored or inoperative position of the latter, and also whereby the supplemental panels and normal panel may be adjusted in different angular positions to intercept oncoming rays, reflections or glare from divers directions; means, as a part of the connecting instrumentalities between the panels, whereby a substantial yield or automatic displacement of the panels with reference to the normally fastened end of the customary panel to accommodate for any expansion or contraction of the material of the supplemental panels, to prevent fracture, buckling or impairment at said connections; and means for facilitating the nesting of all of the panels when they are closed together.

All of the foregoing, together with further details of construction and arrangement of the parts, will be apparent from the more specific description hereinafter contained when read in connection with the accompanying drawings forming part hereof, and wherein the preferred embodiment of the invention is illustrated.

In the drawings:

Figure 4 is a longitudinal section through the hinged or inner ends of the supplemental panels.

Figures 5 and 6 are fragmentary plan and edge elevations of one of the end portions of the device.

Figures 7 and 8 are views illustrating the customary manner of securing the visor to the machine for vertical and lateral swinging or adjustable movement thereof.

Figure 9 shows a modified type of bracket arm.

Figure 10 is a fragmentary view of a corner portion of one of the supplemental panels.

Figure 11 is a sectional view on the line 11—11 of Figure 10.

Figure 12 is a sectional view on the line 12—12 of Figure 10, rotated 90° clockwise.

Figure 13 is a detail perspective view of one of the supporting brackets for the supplemental panels.

Figure 14 is a detail perspective view of the clamp employed in connection with the bracket shown in Figure 13.

Figure 15 is a sectional view taken on lines 15—15 of Figure 2 illustrating the relative position of the panels and the bracket.

Figure 1:
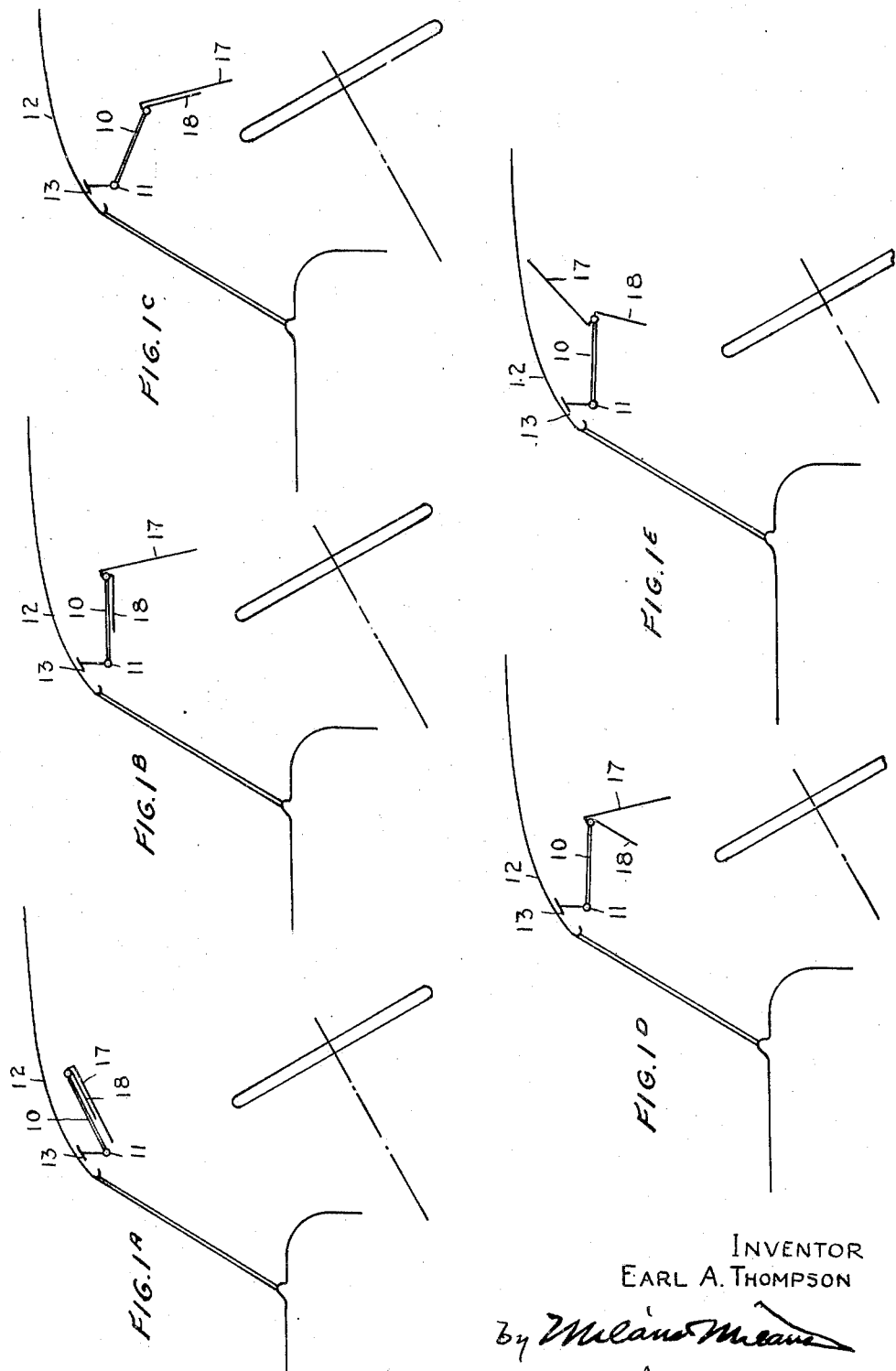
Figure 1A is an end view showing the position of the visor when not in use with the panels nested.
Figure 1B is an end view showing the visor with one panel nested and the other panel in position for use.
Figure 1C is an end view showing the visor with both panels swung in position for use.
Figure 1D is an end view showing the visor with both panels swung in position for use, the panels being adjusted relative to one another.
Figure 1E is an end view showing the visor with one panel swung upwardly to non-use position and the other panel downwardly in position for use.

Referring more particularly to the drawings wherein like reference characters designate the same parts in the several figures of the drawing, 10 represents the customary, usually opaque, visor or panel of the device pivotally attached at 11 to the upper forward part 12 of the body of the vehicle. As is recognized in the art, the details of this pivoting arrangement being old, not constituting a part of the instant invention, will need no special description in addition to the showing thereof in Figures 7 and 8, save that it comprises a bracket 13 fastened to the top 12 by screws or the like 14 and carries a laterally swinging socket 15, operatively associated with a shaft 16 or equivalent pintle carried at the upper edge of the visor or panel pivotally and swingingly supporting the latter.

17 and 18 are supplemental panels attached to the normal visor or panel 10 and entirely supported from the latter, these supplemental panels 17 and 18 being preferably formed of plates of transparent plastic material, such as that commercially known in the art as "Plexiglas" or equivalent substance. Such material is especially adapted for making lenses for visors because of its durability and uniformly clear optical qualities and readily lends itself, during its manufacture, to the incorporation of proper pigments or dyes to produce the desired light filtering properties to eliminate "unwanted" rays yet allow the "wanted" rays to come through so that the image of the scene will be undistorted and color perception uniformly maintained throughout the spectrum. "Plexiglas" or similar materials, however, have a relatively higher coefficient of expansion than the material of which the ordinary opaque visors are usually made (fiber board covered by cloth or leather). Therefore, when used in association with the normal visor, which may be relatively stable or less subject to change of temperature conditions, the invention embraces means, in its mounting of the supplemental panels, to compensate for any relative difference in the expansion of the panels, having in mind that an installation in a vehicle, such as an automobile, may be subjected to a temperature range of 20° to 30° F. below zero up to possibly 140° to 150 F. above zero, where the vehicle might be parked in the hot sun with windows closed, etc.

A fundamental characteristic of the present improvements resides in the relative sizes of the two transparent visor panels 17 and 18. It is to be noted that the width of the panel 18, relative to the panel 17 (as distinguished from the length thereof which is approximately the same in both instances) is much less than the width of the corresponding panel 17. In the illustrated instance the width of the panel 18 is approximately two-thirds of the width of the panel 17.

In daytime driving the intensity of the light emanating from the sky is several times as great as the average of that normally reflected from objects constituting the scene below the horizon. In other words there is always present from the sky, even though overcast, a light intensity sufficient to produce eye strain and fatigue, consequently the degree of filtering properties needed, to subdue the light from above the horizon, is greater than is required, or desirable, to properly reduce the glare from below the horizon. To meet this condition the panel 17 is provided of sufficient width to permit the driver or passenger to obtain protection or coverage of the entire field of view afforded by the windshield panel of the vehicle. The lens 18 is reduced in width so that it may be adjustably positioned in combination with the lens 17 to add more-or-less additional shielding above the horizon.

In order to avoid objectionable reflections appearing in the lens originating from portions of the forward part of the vehicle, such as the cowling and instrument panel, it is necessary that the width of the lens 18 be reduced sufficiently so that when positioned to achieve the above-mentioned object, its angle will be such that objectionable reflections cannot occur. If the panel 18 be made of substantially the same width as the panel 17 it would have to be adjusted to such an acute angle, with respect to the visor panel 10, in order to achieve the object pointed out above, that its polished surface would pick up the reflections from the cowl and instrument panel of the vehicle and thus prevent clear vision through the lens. The narrow lens 18 also permits shielding of the eyes from the light of the sky when the panel 17 is turned out of the field of vision to take care of conditions where the light intensity does not require any shielding of the scene below the horizon.

With the foregoing understanding the pivotal or hinge connections for the various panels are now pointed out. The normal visor or panel 10 is usually made of fibreboard, covered with cloth or leather, and has at each end thereof a metal fastening member or bracket 19 having jaw-like end flanges as at 20—20. The corners of the flanges, forming the jaws, being turned inwardly thus producing four diagonally disposed teeth 21, adapted to penetrate or bite into the opposite surfaces of the visor panel 10. These teeth 21 will thus prevent displacement of the jaws in any direction when the supplemental visor is installed or attached to said panel 10. For causing the jaws to close on the visor panel 10 and permanently remain closed, clamp members 23 are provided to be forced thereover. The jaw flanges 20 and the clamps 23 are each provided with interfitting embossed ribs as at 22 and 24, for guiding or locating the clamp members 23 in proper relation to the jaw flanges. The opposite ends of the brackets 19 have spring-like or flexible arms 25 and an end portion 26 apertured as at 27 to accommodate the pivot screws 28, to unite the visor panels 10, 17 and 18 together. The end portions or pivot members 26 are located between complemental pivot flanges or ears 29 and 30. The flanges or ears 29 being carried by the panel 18 and the flanges or ears 30 being carried by the panel 17, and the members 29 and 30 being oppositely embossed as at 17a and 18a to form face friction surfaces adjacent their outer periphery coacting with the opposite faces of the end portion 26 of the brackets 19. The springs 31, sleeved on the pivot screws 28, adjustably compressed by the nuts 32, threaded on the screws, create the desired pressure to produce the proper amount of friction, between the ears 29 and 30 and the end portion 26 to hold, independently, either visor panel 17 or 18 in any preadjusted position.

The hinge members of the supplemental panels 17 and 18 are formed integral with fastening plates 33 and 34, respectively, overlying the supplemental panels 18 and 17, these fastening plates being fixedly secured to their respective panels by rivets 35 or their equivalents, thereby affording corner reinforcements for the material of the panels. These reinforcements are further braced or strengthened by additional corner pieces 36 on the opposite face of the panels provided with outwardly projecting flanges 37 to abut the corner marginal edges of the panels, the whole being bound together by the rivets 35 beforementioned, which also pass through apertures 38 of the corner braces 36. It will be appreciated that the relatively wide flanges 25 of the brackets 19, overlapping the edges of the panels when in folded state, prevent any excessive longitudinal displacement or strain of the panels 17 and 18 on their hinge portions.

Figure 2:
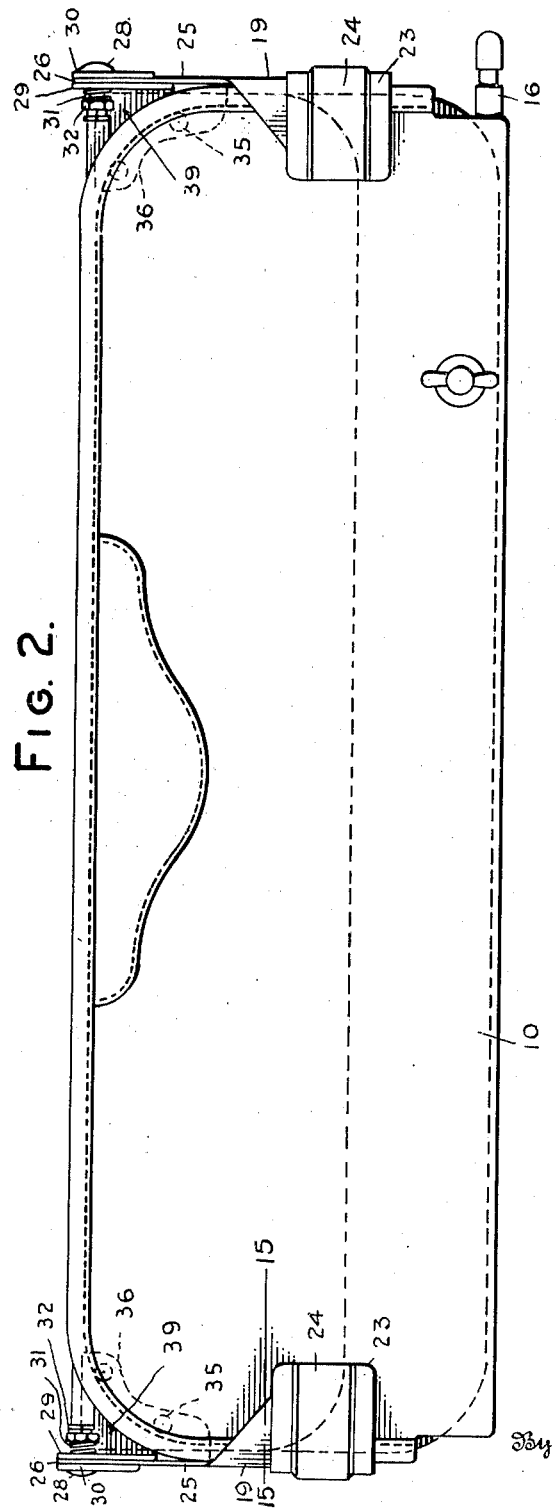
Figure 2 is a plan view of the complete visor, detached from the vehicle, and in completely folded or nested condition.
Figure 3:
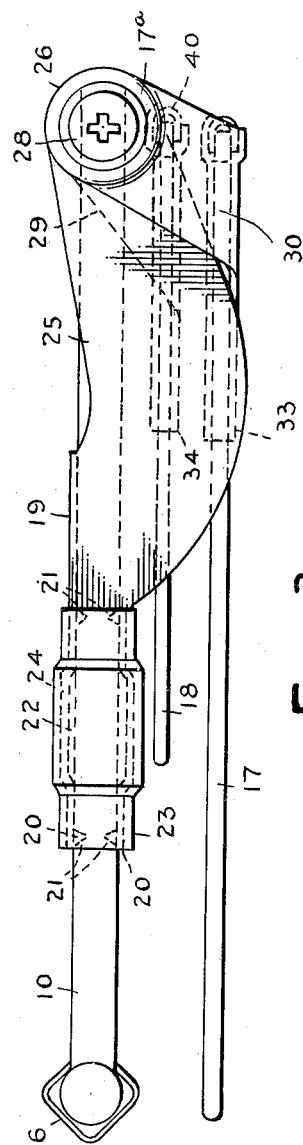
Figure 3 is an end view of the same, somewhat enlarged.

It will also be noted on reference to Figures 2 and 15 that sufficient space has been provided between the edges of the panels 17 and 18 and the bracket 19, when nested, to take care of reasonable expansion of the panels due to temperature changes without damage to the panels.

To reinforce the inner edges of the plastic lenses or panels against lateral deflection, warping or misalignment, the said edges are embraced within channel or U-shaped members 40, extending throughout said edges, and terminating at the opposite ends of the panel where they are held against removal by an end portion of one of the plates, for instance 36, as shown, which end is turned over the U-shaped strips sufficiently to confine it against movement away from the edge of the panel. The engagement of the U-shaped strip with the lens or panel proper and with the turned-over edge of the plate 36, being throughout a frictional fit only, whereby to permit the reinforcing strip 40 to have relative longitudinal movement or play with reference to the lens or panel, or vice versa, thereby to permit relative expansion or contraction under changing temperature conditions without buckling or distorting, etc. of the panel.

It will be appreciated that in the combination of the supplemental visors with the normal visor, resulting in the enlargement of the device as a whole and the suspension of supplemental visors, it is very desirable that a means be provided to eliminate possible play or vibration of the suspended or projected transparent panels, and such is abundantly warded against from the fact that the latter are firmly secured at each end to the normal panel 10, enabled by the clamping of the supplemental panels to the side edges of the opaque panel, as distinguished from supporting the supplemental panels at one end only thereof, or at some point intermediate of the ends thereof. It will also be observed that owing to the fact that the normal opaque panels, commonly in use, are always rounded at the corners of their free edge, spaces 39 are always present, and such spaces are availed of to accommodate the inwardly projecting friction hinge construction, thereby avoiding any projecting parts beyond the side edges of the structure.

In addition to the elimination of vibration, in an attachment for automobiles and the like, there is the additional factor to be considered when mounting panels that are to be folded into close association or juxtaposition which results in contacting of edges or parts of one panel repeatedly on the surface of one-or-more of the members, eventually causing a marring of the surface thereof as by lines or scratches in the area of the contact. Here, such a matter is to be considered because of the reduced size of one of the transparent panels leaving its free edge within the area of the surface of the larger transparent panel and it would be the probability of the free edge of the reduced panel, under constant vibratory contact with the face of the companion transparent panel to mar the surface of the latter and correspondingly impair the clear vision therethrough. Therefore, the mountings for the supplemental panels are formed in such manner that they have the dual function of not only securing the supplemental panels in place but also preventing any possibility of contact between the surfaces of the lenses. This is constituted by having the rivets 35 headed or protruded a sufficient distance beyond the surface of the lenses to relatively abut and always maintain a minimum spaced relation between the surfaces of the lenses.

It is to be observed that since the supplemental visor is hinged at the unhinged edge of the normal opaque visor that the latter performs the function of an adjustable extension to bring the transparent visor near the eyes of the driver or other passenger and thus enlarge the effective shielding coverage of the field of view. This construction likewise permits the vertical adjustment of the transparent visor to suit people of various heights and affords eye protection over the complete field of vision allowed by the windshield panel of the vehicle.

With the foregoing mechanical facilities in mind, reference is made to the diagrammatic illustrations in Figures 1A to 1E, exhibiting different adjustments of the visor to meet various conditions to be compensated for in the travel of an automobile or vehicle, and while such adjustments will be clearly appreciated from the illustration alone, the illustration is supplemented by the definitions as follows:

In Figure 1A the visor is shown in folded or collapsed state, with the normal visor and supplemental visor panels folded into parallel relationship and stored, so to speak, or held in inoperative position within the top of the car.

In Figure 1B the visor is shown with the normal or opaque panel slightly lowered on its hinge with the supplemental panel 18 thrown back to underlie the panel 10 and the panel 17 depended downwardly therefrom into a slightly rearwardly divergent relationship, in which event clear vision may be had through the depending panel.

In Figure 10 an arrangement similar to the arrangement depicted in Figure 1B, appears in which both of the supplemental lenses 17 and 18 are juxtaposed and depended to correspondingly modify (increase) the protection to be derived from the combination as in instances of more serious or intense sun rays, such as from snow, or reflections from the forward metal parts or polished portions of the vehicle.

The arrangement or adjustment illustrated in Figure 1D shows the panel 10 and supplemental visor lens 17 in approximately the same positions as illustrated in Figure 1B, while the supplemental visor lens 18 is brought down to more effectively shield the eyes of the driver or passenger from the more intense light coming from above the horizon. Normal vision of the road and landscape below the horizon is had through the supplemental visor lens 17.

In Figure 1E the narrow panel or visor lens 18 is shown in shielding position (the panel 17 being moved up out of the line of vision as shown.) This arrangement is used under conditions where shielding is only required from the sky. At night this arrangement is used to shield the eyes from oncoming headlights. Since the headlights of an oncoming vehicle are approximately 2½ feet above the road, the rays from headlights can be screened through the lens 18, while a normal clear vision of the road, beyond the oncoming vehicle, is had below this screen. This materially increases the safety of night driving.

From these recitations it will be obvious that the nature of the material forming the body of the supplemental panels or lenses is predeterminatively such that their relatively light or dark coloring or filtering properties, and correspondingly different glare-preventing characteristics, will enable the user to so adjust the supplemental panels to secure the varying protection or shielding of the eyes derived from the utilization of the visor panel or section 17, or alternatively the visor panel or section 18, or the combination and joint use of the two panels 17 and 18 when positioned in various relationships.

In swinging the respective supplemental panels to obtain their different arrangements and adjustment the same is facilitated by the supplemental panels being, as stated, of different widths. Otherwise there may be a tendency for the finger of the user to engage the adjacent edges of both the panels 17 and 18 when not so intended.

Efforts have been made to provide a visor with more-or-less differential effectiveness, but, so far as known, such devices and arrangements have been comparatively complicated, correspondingly expensive to produce, awkward or difficult in adjustment, and incapable of accomplishing the ends attained by the instant invention. The improved or novel features or their equivalents will be particularly pointed out in the hereto appended claims.

I claim:

1. The combination with the normal visor panel of a vehicle and means for adjustably mounting the same, of a supplemental panel, and means for adjustably securing the same, an edge of the supplemental panel being parallel with and in juxta-position to the free edge of said normal panel, said securing means comprising fastening members engaged with the side edge portions of the normal panel, and extensions thereof to which the ends of the supplemental panel are pivotally connected.

2. An attachment for the normal visor panel of a vehicle comprising a supplemental panel, and means whereby the same may be attached to said normal visor panel, comprising fastening members in which the side edge portions of the normal panel are secured, and extensions thereof to which the ends of the supplemental panel are pivotally connected.

3. An attachment for the normal visor panel of a vehicle comprising a supplemental panel, and means whereby the same may be attached to said normal visor panel, comprising fastening members in which the side edge portions of the normal panel may be fiitted and secured, and extensions thereof to which the ends of the supplemental panel are pivotally connected, said extensions being elongated to constitute yieldable portions to allow for expansion and contraction of the supplemental panel.

4. The combination with the normal visor panel of a vehicle and means for mounting the same, of a supplemental panel, and means for adjustably securing the same, an edge of the supplemental panel being parallel with and in juxta-position to the free edge of said normal panel, said securing means comprising fastening members engaged with the side edge portions of the normal panel, and extensions thereof to which the ends of the supplemental panel are pivotally connected, said extensions being elongated to constitute yieldable portions to allow for expansion or contraction of the supplemental panel.

5. An attachment for the normal visor panel of a vehicle comprising a supplemental panel, and means whereby the same may be attached to said normal visor panel, comprising fastening members in which the side edge portions of the normal panel may be fitted and secured, and extensions thereof to which the ends of the supplemental panel are pivotally connected, said extensions being elongated and provided with bowed portions to constitute spring-like yieldable portions to allow for expansion and contraction of the supplemental panel.

6. The combination with the normal visor panel of a vehicle and means for adjustably mounting the same, of a supplemental panel, and means for adjustably securing the same, an edge of the supplemental panel being parallel with and in juxta-position to the free edge of said normal panel, said securing means comprising fastening members engaged with the side edge portions of the normal panel, extensions thereof to which the ends of the supplemental panel are pivotally connected, the pivot portions on the supplemental panel that cooperate with the extensions comprisng securing plates overlying and secured to the corners of the supplemental panel and projected beyond the same to provide pivot ears parallel with the extensions, and pivot pins for said ears.

7. The combination with the normal visor panel of a vehicle and means for adjustably mounting the same, of a supplemental panel, and means for adjustably securing the same, an edge of the supplemental panel being parallel with and in juxta-position to the free edge of said normal panel, said securing means comprising fastening members engaged with the side edge portions of the normal panel, extensions thereof to which the ends of the supplemental panel are pivotally connected, the pivot portions on the supplemental panel that cooperate with the extensions comprising securing plates overlying and secured to the corners of the supplemental panel and projected beyond the same to provide pivot ears parallel with the extensions, pivot pins for said ears, and auxiliary corner braces for the supplemental panel adapted to overlie the opposite face thereof and each having flanges to surround the marginal edges of the corner associated.

8. The combination with the normal visor panel of a vehicle and means at its forward portion for adjustably mounting the same, of a pair of supplement panels, the combined visor being variously adjustable, the same including pivotal connections between each of said supplemental panels and the free edge of said normal panel whereby each supplemental panel may be adjusted to-and-fro relative to the normal panel selectively to occupy a nested position with all said panels in superposed parallel relationship and as associated individual extensions of said normal panel to occupy divers angular positions.

9. The combination with the normal visor panel of a vehicle and means at its forward portion for adjustably mounting the same, of a pair of supplemental panels, the combined visor being variously adjustable, the same including pivotal connections between each of said supplemental panels and the free edge of said normal panel whereby each supplemental panel may be adjusted to-and-fro relative to the normal panel selectively to occupy a nested position with all said panels in superposed parallel relationship and as associated individual extensions of said normal panel to occupy divers angular positions, the supplemental panels when nested occupying parallel positions over one face of the normal panel.

10. The combination with the normal visor panel of a vehicle and means at its forward portion for adjustably mounting the same, of a pair of supplemental panels, the combined visor being variously adjustable, the same including pivotal connections between each of said supplemental panels and the free edge of said normal panel whereby each supplemental panel may be adjusted to-and-fro relative to the normal panel selectively to occupy a nested position with all said panels in superposed parallel relationship and as associated individual extensions of said normal panel to occupy divers angular positions, the supplemental panels when nested occupying parallel positions over one face of the normal panel, the engageable edge of the outermost supplemental panel extending beyond the corresponding engageable edge of the other supplemental panel when the panels are superimposed to facilitate manipulation thereof.

11. The combination with the normal visor panel of a vehicle and means at its forward portion for adjustably mounting the same, of a pair of supplemental panels of relatively transparent plastic substance, the combined visor being variously adjustable, the same including pivotal connections between each of said supplemental panels and the free edge of said normal panel whereby each supplemental panel may be adjusted to-and-fro relatively to the normal panel selectively to occupy a nested position and all said panels in superposed parallel relationship and as associated individual extensions of said normal panel to occupy divers angular positions, the supplemental panels when nested occupying parallel positions over one face of the normal panel, and arms secured to the normal panel forming a part of the pivotal connections, said arms being of substantial width and length between which the supplemental panels are loosely nestable into folded position whereby to prevent abnormal relative longitudinal displacement while affording ample space for relative expansion and contraction of the panels.

12. The combination with the normal visor panel of a vehicle and means at its forward portion for adjustably mounting the same, of a pair of supplemental panels, the combined visor being variously adjustable, the same including pivotal connections between each of said supplemental panels and the free edge of said normal panel whereby each supplemental panel may be adjusted to-and-fro relative to the normal panel selectively to occupy a nested position with all said panels in superposed parallel relationship and as associated individual extensions of said normal panel to occupy divers angular positions, the supplemental panels when nested occupying parallel positions over one face of the normal panel, and said pivotal connections comprising ears on the normal and supplemental panels arranged with the ear on the normal panel between the ears on the supplemental panels, said ears being offset longitudinally of the panels and pivoted together.

13. The combination with the normal visor panel of a vehicle and means at its forward portion for adjustably mounting the same, of a pair of supplemental panels, the combined visor being variously adjustable, the same including pivotal connections between each of said supplemental panels and the free edge of said normal panel whereby each supplemental panel may be adjusted to-and-fro relative to the normal panel selectively to occupy a nested position with all said panels in superposed parallel relationship and as associated individual extensions of said normal panel to occupy divers angular positions, the supplemental panels when nested occupying parallel positions over one face of the normal panel, said pivotal connections comprising ears on the normal and supplemental panels arranged with the ear on the normal panel between the ears on the supplemental panels, said ears being offset longitudinally of the panels and pivoted together by a pin and cooperating spring fastening, and the ears being formed with abutting areas to provide a controllable friction grip in the pivotal connections.

14. The combination with the normal visor panel of a vehicle and means at its forward portion for adjustably mounting the same, of a pair of supplemental panels, the combined visor being variously adjustable, the same including pivotal connections between each of said supplemental panels and the free edge of said normal panel whereby each supplemental panel may be adjusted to-and-fro relative to the normal panel selectively to occupy a nested position with all said panels in superposed parallel relationship and as associated individual extensions of said normal panel to occupy divers angular positions, the outermost supplemental panel being swingable upwardly from the normal panel when the normal panel approximates a horizontal position and the inner supplemental panel being swingable relatively downwardly, and selectively the innermost panel can be swung upwardly to underlie the normal panel and the outermost supplemental panel thrown downwardly from the edge of the normal panel into a position approximating a vertical.

15. An attachment for the normal visor panel of a vehicle comprising a supplemental panel, and means whereby the same may be attached to said normal visor panel, comprising fastening members in which the side edge portions of the normal panel may be fitted and secured, and extensions thereof to which the ends of the supplemental panel are pivotally connected, the fastening members comprising U-shaped clips engaging over the edge portions of the normal panel and impinged into interlocking engagement therewith.

16. An attachment for the normal visor panel of a vehicle comprising a supplemental panel, and means whereby the same may be attached to said normal visor panel, comprising fastening members in which the side edge portions of the normal panel may be fitted and secured, and extensions thereof to which the ends of the supplemental panel are pivotally connected, the fastening members comprising U-shaped clips engaging over the edge portions of the normal panel and impinged into interlocking engagement therewith at the corners of the clips, said corners having teeth disposed diagonally of said corners to resist displacement in directions both longitudinally and transversely of the panel to which the clips are applied.

17. In a visor, an elongated panel of plastic sheet material, having an edge protected by a reinforcing metallic strip, said reinforcing metallic strip being of approximately U-shaped cross-section and frictionally engaging said edge whereby the panel may adjust itself and avoid buckling when expanding under heated conditions, flanged means on the panel loosely interfitting with said reinforcing metallic strip to prevent lateral displacement of the latter while permitting relative longitudinal movement, and means for maintaining said panel on a vehicle.

18. The combination with a plastic like panel of elongated configuration, of means for mounting the same in a vehicle, reinforcing means along an edge of said panel relatively loosely engaging the same to facilitate relative longitudinal displacement therebetween and prevent buckling when the panel is subjected to changing temperature conditions, and means for preventing lateral displacement of said reinforcing means with respect to the panel.

19. The combination of a pair of panels of a vehicle visor, means for supporting the same on the vehicle, hinge connections between the panels whereby one panel may be selectively folded to superposed position upon and extended with reference to the other, one of said panels being of substantially less width than the other panel, and means associated with the hinge connections to minimize the contact of the edge of the superposed narrow panel against the face of the wider panel under vibration to prevent marring the engaged face, said means associated with the hinge connections comprising rivets for securing the hinge connections to the panels, said rivets having enlarged heads contacting one another to hold the panels in spaced relation.

20. The combination with a normal visor, of supplemental visors, and means for hinging the supplemental visors to the normal visor, comprising ears on the supplemental visors at the ends thereof, ears on the normal visor respectively located between the ears of the supplemental visors, a threaded member passing through all of said ears at the respective ends, a compression spring on each threaded member, and a tensioning nut on each threaded member combined with embossed bearing surfaces on the ears of the supplemental visors to bear upon the interposed ears of the normal visor, together constituting a friction adjustable clamp between the several visors.

21. In combination with a normal visor of an automobile having rounded corners affording spaces at the free edge thereof, supplemental visors, and inwardly projecting hinging means for securing the supplemental and normal visors together at the ends thereof, including pivots projecting into the spaces afforded by the rounded corners of the normal visor combined with yieldable friction means associated with said pivots.

EARL A. THOMPSON.

REFERENCES CITED

The following references are of record in the file of this patent:

UNITED STATES PATENTS

| Number | Name | Date |
| --- | --- | --- |
| 1,444,735 | Dubuc | Feb. 6, 1923 |
| 1,610,503 | Muncie | Dec. 14, 1926 |
| 1,775,486 | Clements | Sept. 9, 1930 |
| 2,252,716 | Levy | Aug. 19, 1941 |
| 2,261,881 | Horstmann | Nov. 4, 1941 |